United States Patent
Castorena Martinez et al.

(10) Patent No.: US 11,754,415 B2
(45) Date of Patent: Sep. 12, 2023

(54) SENSOR LOCALIZATION FROM EXTERNAL SOURCE DATA

(71) Applicant: Ford Global Technologies, LLC, Dearborn, MI (US)

(72) Inventors: Juan Enrique Castorena Martinez, Southfield, MI (US); Mostafa Parchami, Dearborn, MI (US); Codrin Cionca, Ann Arbor, MI (US); Siddharth Agarwal, Dearborn, MI (US); Gintaras Vincent Puskorius, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 387 days.

(21) Appl. No.: 16/563,098

(22) Filed: Sep. 6, 2019

(65) Prior Publication Data
US 2021/0072041 A1 Mar. 11, 2021

(51) Int. Cl.
*G01C 21/36* (2006.01)
*G08G 1/13* (2006.01)
*G06V 20/58* (2022.01)
*G06V 20/64* (2022.01)
*H04W 4/46* (2018.01)

(52) U.S. Cl.
CPC .......... *G01C 21/367* (2013.01); *G06V 20/58* (2022.01); *G06V 20/64* (2022.01); *G08G 1/13* (2013.01); *H04W 4/46* (2018.02)

(58) Field of Classification Search
CPC ... G01C 21/367; H04W 4/46; G06K 9/00201; G06K 9/00805; G08G 1/13
See application file for complete search history.

(56) References Cited

U.S. PATENT DOCUMENTS

| | | | |
|---|---|---|---|
| 7,558,583 B2 | 7/2009 | Ledeczi et al. | |
| 7,925,730 B1 | 4/2011 | Gotsman et al. | |
| 9,031,809 B1 | 5/2015 | Kumar et al. | |
| 10,228,438 B2 | 3/2019 | Van Puijenbroek | |
| 2010/0256852 A1* | 10/2010 | Mudalige | G08G 1/164 701/24 |
| 2018/0283880 A1* | 10/2018 | Croyle | H04W 4/80 |
| 2019/0042865 A1* | 2/2019 | Vallespi-Gonzalez | G01S 17/931 |
| 2019/0227175 A1* | 7/2019 | Steinberg | G01S 17/93 |
| 2020/0005489 A1* | 1/2020 | Kroeger | G06T 7/80 |

(Continued)

OTHER PUBLICATIONS

L. Delobel, R. Aufrere, C. Debain, R. Chapuis and T. Chateau, "A Real-Time Map Refinement Method Using a Multi-Sensor Localization Framework," in IEEE Transactions on Intelligent Transportation Systems, vol. 20, No. 5, pp. 1644-1658, May 2019, doi: 10.1109/TITS.2018.2840822. (Year: 2019).*

(Continued)

*Primary Examiner* — Maceeh Anwari
*Assistant Examiner* — Charles Pall
(74) *Attorney, Agent, or Firm* — Frank A. MacKenzie; Bejin Bieneman PLC (57) ABSTRACT

A system includes a computer including a processor and a memory storing instructions executable by the processor to identify a location and an orientation of a vehicle on a map. The instructions include instructions to determine a location of an infrastructure sensor on the map based on the location and the orientation of the vehicle, data from a vehicle sensor, and data from the infrastructure sensor.

20 Claims, 5 Drawing Sheets

(56) References Cited

U.S. PATENT DOCUMENTS

2020/0124725 A1* 4/2020 Qiu ........................ G06K 9/622
2020/0133272 A1* 4/2020 Chong ................. G05D 1/0088

OTHER PUBLICATIONS

Zhou et al., "Localization using a Mobile Beacon in Wireless Sensor Networks", Information Technology Journal 12 (2):323-330, 2013.

* cited by examiner

SENSOR LOCALIZATION FROM EXTERNAL SOURCE DATA

BACKGROUND

A vehicle may operate in an autonomous mode, a semiautonomous mode, or a nonautonomous mode. In the autonomous mode, each of a propulsion system, a braking system, and a steering system are controlled by a vehicle computer; in a semiautonomous mode the vehicle computer controls one or two of the propulsion system, the braking system, and the steering system; in a nonautonomous mode, a human operator controls the propulsion system, the braking system, and the steering system. The vehicle may operate in the autonomous mode and the semiautonomous mode based at least in part on data from an infrastructure sensor.

DETAILED DESCRIPTION

A system includes a computer including a processor and a memory storing instructions executable by the processor to identify a location and an orientation of a vehicle on a map. The instructions include instructions to determine a location of an infrastructure sensor on the map based on the location and the orientation of the vehicle, data from a vehicle sensor, and data from the infrastructure sensor.

The instructions may further include instructions to identify the location and the orientation of the vehicle based on a location of an object on the map and a location of the object relative to the vehicle.

The instructions may further include instructions to identify a first location of an object on the map and based on the data from the vehicle sensor, to identify a second location of the object relative to the infrastructure sensor and based on the data from the infrastructure sensor, and to determine the location of the infrastructure sensor based on the first and second locations of the object.

The instructions may further include instructions to identify a first plane based on the data from the vehicle sensor, to identify a second plane based on the data from the infrastructure sensor, and to determine the location of the infrastructure sensor based on the first plane and the second plane.

The instructions may further include instructions to identify a first vector based on the data from the vehicle sensor, to identify a second vector based on the data from the data from the infrastructure sensor, and to determine the location of the infrastructure sensor based on the first vector and the second vector.

The data from the vehicle sensor and the data from the infrastructure sensor may include point-cloud data.

The instructions may further include instructions to identify a second location and a second orientation of the vehicle relative to the map, collect second data from the vehicle sensor while the vehicle is at the second location and in the second orientation, and to determine the location of the infrastructure sensor on the map based on the location and the orientation of the vehicle, the data from the vehicle sensor, the second location and the second orientation of the vehicle, the second data from the vehicle sensor, and the data from the infrastructure sensor.

The instructions may further include instructions to determine an orientation of the infrastructure sensor on the map based on the location and the orientation of the vehicle, the data from the vehicle sensor, and the data from the infrastructure sensor.

The computer may be remote from the vehicle and the infrastructure sensor, and the instructions may further include instructions to store the location of the infrastructure sensor on the map in the memory of the computer.

The instructions may further include instructions to store the location of the infrastructure sensor on the map in a memory of the infrastructure sensor.

The instructions may further include instructions to navigate a second vehicle based on the location of the infrastructure sensor.

A method includes identifying a location and an orientation of a vehicle on a map. The method includes determining a location of an infrastructure sensor on the map based on the location and the orientation of the vehicle, data from a vehicle sensor, and data from the infrastructure sensor.

The method may further include identifying the location and the orientation of the vehicle based on a location of an object on the map and a location of the object relative to the vehicle.

The method may further include identifying a first location of an object on the map and based on the data from the vehicle sensor, identifying a second location of the object relative to the infrastructure sensor and based on the data from the infrastructure sensor, and determining the location of the infrastructure sensor based on the first and second locations of the object.

The method may further include identifying a first plane based on the data from the vehicle sensor, identify a second plane based on the data from the infrastructure sensor, and determining the location of the infrastructure sensor based on the first plane and the second plane.

The method may further include identifying a first vector based on the data from the vehicle sensor, identifying a second vector based on the data from the data from the infrastructure sensor, and determining the location of the infrastructure sensor based on the first vector and the second vector.

The data from the vehicle sensor and the data from the infrastructure sensor may include point-cloud data.

The method may further include identifying a second location and a second orientation of the vehicle on the map, collecting second data from the vehicle sensor while the vehicle is at the second location and in the second orientation, and determining the location of the infrastructure sensor on the map based on the location and the orientation of the vehicle, the data from the vehicle sensor, the second location and the second orientation of the vehicle, the second data from the vehicle sensor, and the data from the infrastructure sensor.

The method may further include determining an orientation of the infrastructure sensor relative to the map based on the location and the orientation of the vehicle, the data from the vehicle sensor, and the data from the infrastructure sensor.

The method may further include storing the location of the infrastructure sensor on the map in a memory of the infrastructure sensor.

The method may further include navigating a second vehicle based on the location of the infrastructure sensor.

A computer may have a processor and a memory storing instructions executable by the processor to perform the method.

The computer may be remote from the vehicle and the infrastructure sensor, and the instructions may further include instructions to store the location of the infrastructure sensor on the map in the memory of the computer.

A computer readable medium may store instructions executable by a processor to perform the method.

Figure 1:
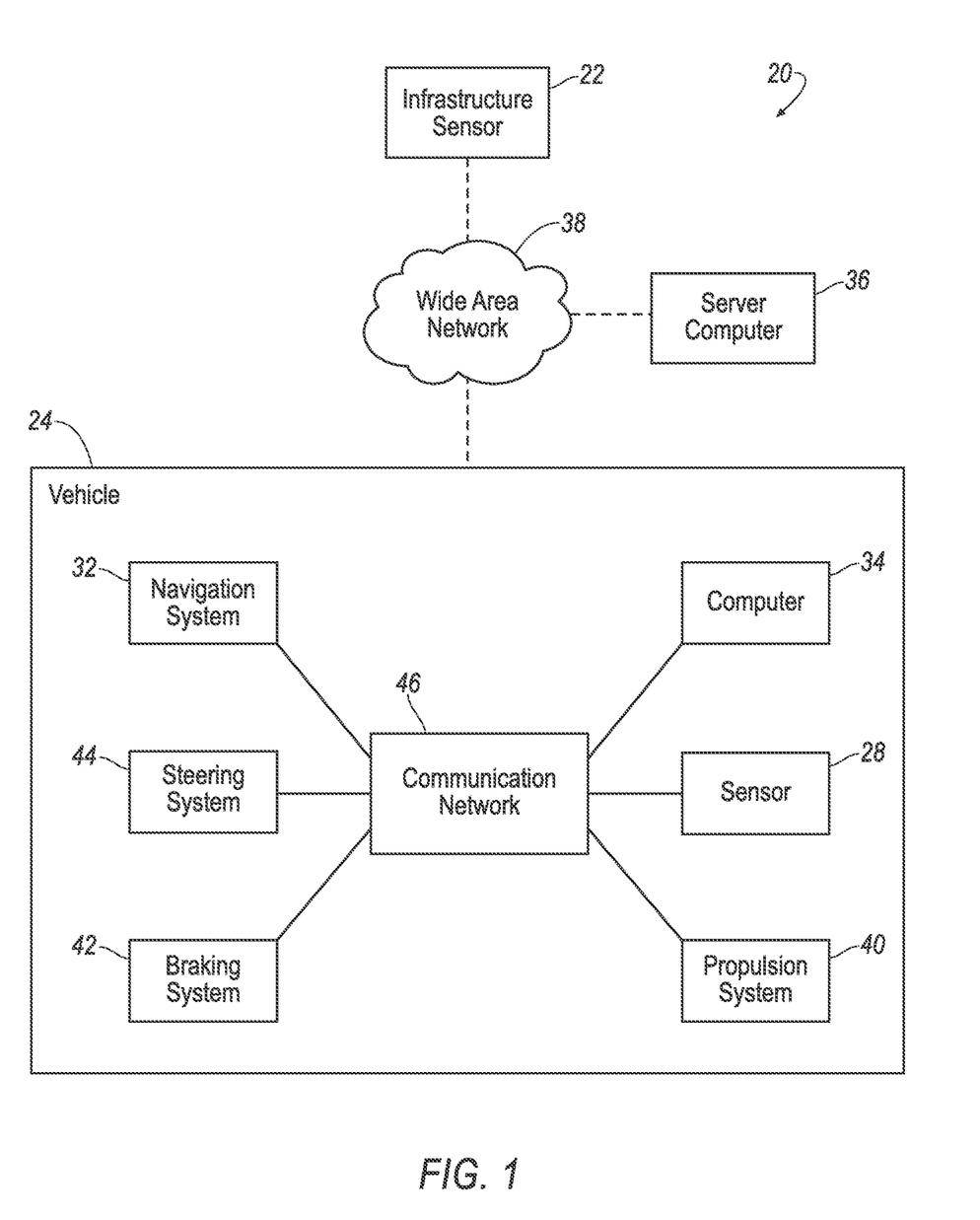
FIG. 1 is a block diagram of components of a system for determining a location of an infrastructure sensor on a map.
Figure 2:
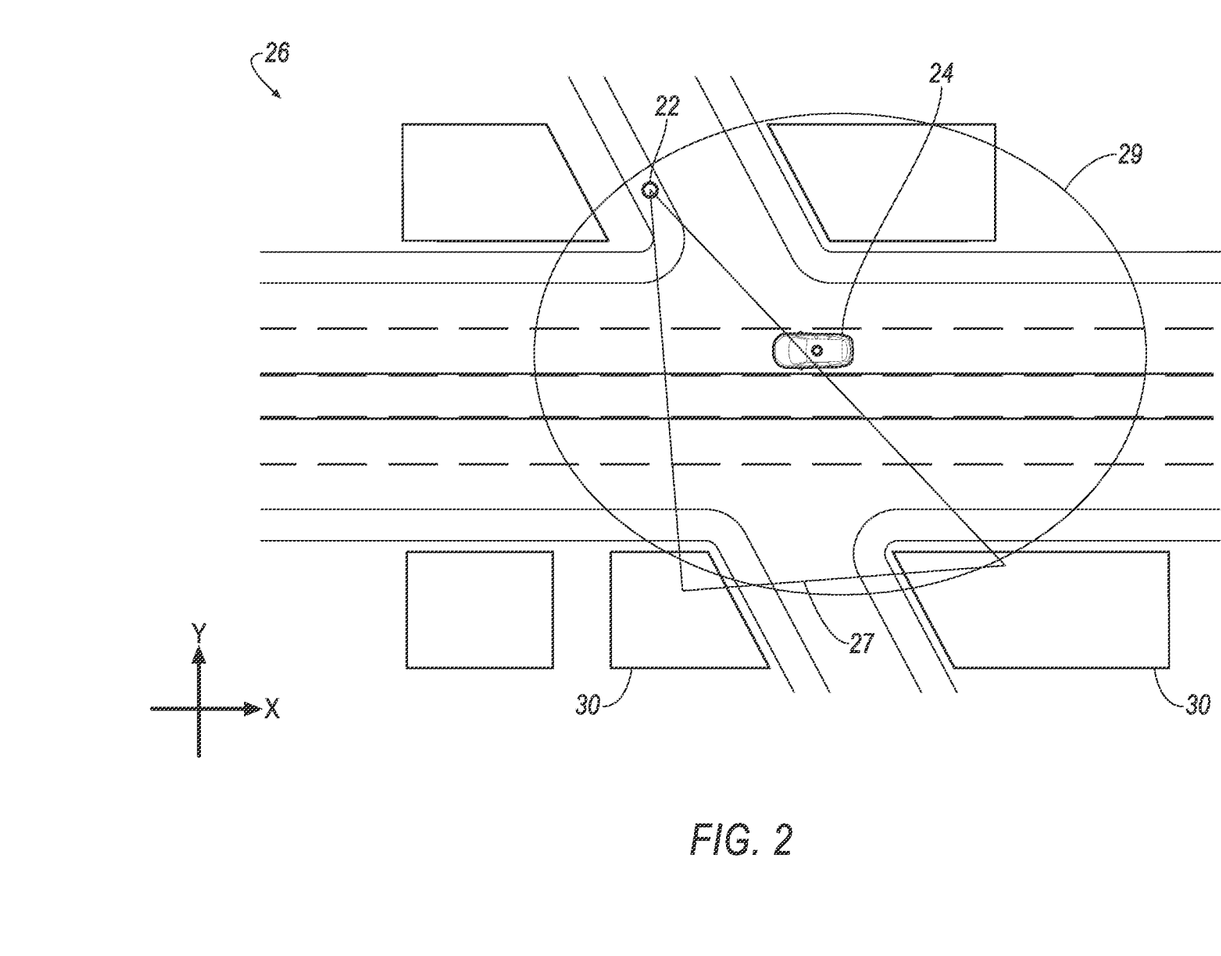
FIG. 2 is an illustration of a map including the infrastructure sensor and a vehicle.

Referring to FIGS. 1 and 2 a system 20 provides for determining a location of an infrastructure sensor 22 on a map 26. The system 20 includes a computer 34, 36 having a processor and a memory storing instructions executable by the processor to identify a location and an orientation of a vehicle 24 on the map 26. The instructions include instructions to determine a location of the infrastructure sensor 22 on the map 26 based on the location and the orientation of the vehicle 24, data from a sensor 28 of the vehicle 24, and data from the infrastructure sensor 22.

The system 20 enable the location of the infrastructure sensor 22 on the map 26 to be determined without requiring that the infrastructure sensor 22 include specific hardware, e.g., a GPS system. Determining the location of the infrastructure sensor 22 on the map 26 provides for data from the infrastructure sensor 22 to be used to identify a location of one or more objects, such as vehicles, on the map 26. Determining the location of the infrastructure sensor 22 on the map 26 also provides for data from the infrastructure sensor 22 to be fused with other data, such as data from other infrastructure sensors and/or vehicles, e.g., for operating a vehicle in an autonomous mode and/or a semiautonomous mode.

The map 26 is illustrated in FIG. 2 as a conventional graphical map but includes a set of data that can be stored in digital format, which can be referred to as map data, that specifies physical features and objects 30, e.g., roads and/or road segments (including highways, roads, city streets, etc.), lanes, bridges, buildings, infrastructure, signs, traffic-lights, etc., at respective locations in a defined area. The map 26 may include data specifying shapes or boundaries of the objects 30. The shapes may be three-dimensional (3-D), e.g., the data may specify heights, widths, and depths of surfaces of the objects 30. The map 26 may include data specifying orientations (i.e., relative positions or directions in a 3-D coordinate system) of the objects 30 on the map 26. The data may specify coordinates of the physical features and objects 30, e.g., latitude and longitude geocoordinates, X-Y-Z coordinates relative to specified X-Y-Z axes having a specified origin, etc. Some coordinates, e.g., X-Y coordinates may be relative to a positioning system (such as GPS), relative to a certain physical feature (such as an intersection of roads or other object 30), or relative to any other suitable datum or data for defining locations on the map 26. The data of the map 26 may be based on cartography documents, a geographical survey, a previously stored map (or at least a portion thereof), or other information suitable for specifying locations of physical features and objects 30 in a defined area. The computer 34, 36 can store map data as is conventionally known, e.g., for use in a vehicle navigation system 32 or the like.

A location on the map 26 specifies where a physical feature or object 30 is on the map 26, e.g., specified X-Y-Z coordinates, GPS coordinates, etc. An orientation on the map 26 specifies a facing direction of a specified surface of the physical feature or object 30 on the map 26, e.g., a specified compass heading direction, angle relative to the X,Y, and Z axes, etc. Data specifying a location and an orientation of a physical feature or object 30 may be stored independent of the map 26. For example, a location and an orientation of the infrastructure sensor 22 on the map 26 may be stored in memory of the infrastructure sensor 22 and the map 26 may be stored in memory of a vehicle computer 34 and/or a server computer 36.

The system 20 can use a network 38 to provide communication among components of the system 20. The network 38 (sometimes referred to as the wide area network 38 because it can include communications between devices that are geographically remote from one another, i.e., not in a same building, vehicle 24, etc.) represents one or more mechanisms by which remote devices, e.g., the server computer 36, the vehicle 24, the infrastructure sensor 22, etc., may communicate with each other. Accordingly, the network 38 may be one or more wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized).

The vehicle 24 may be any type of passenger or commercial vehicle such as a car, a truck, a sport utility vehicle, a crossover vehicle, a van, a minivan, a taxi, a bus, etc. Although illustrated as a passenger vehicle, the vehicle 24 may be unmanned, e.g., a land-based or aerial drone.

The vehicle 24 may operate in an autonomous mode, a semiautonomous mode, or a nonautonomous mode. For purposes of this disclosure, an autonomous mode is defined as one in which each of a propulsion system 40, a braking system 42, and a steering system 44 are controlled by the vehicle computer 34; in a semiautonomous mode the vehicle computer 34 controls one or two of the propulsion system 40, the braking system 42, and the steering system 44; in a nonautonomous mode, a human operator controls the propulsion system 40, the braking system 42, and the steering system 44.

The vehicle 24 includes sensors 28. The sensors 28 may detect internal states of the vehicle 24, for example, wheel speed, wheel orientation, and engine and transmission variables. The sensors 28 may detect the position or orientation of the vehicle 24, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 28 may detect the external world, for example, radar sensors, scanning laser range finders, light detection and ranging (LIDAR) devices, and image processing sensors such as cameras. Lidar sensors measure distances to detected objects 30 by illuminating the object 30 with pulsed laser light and measuring return times of reflected pulses. Differences in return times and wavelengths of reflected pulses can then be used to generate data specifying a point cloud. The sensors 28 may include communications devices, for example, vehicle-to-infrastructure (V2I) or vehicle-to-vehicle (V2V) devices.

Figure 3:
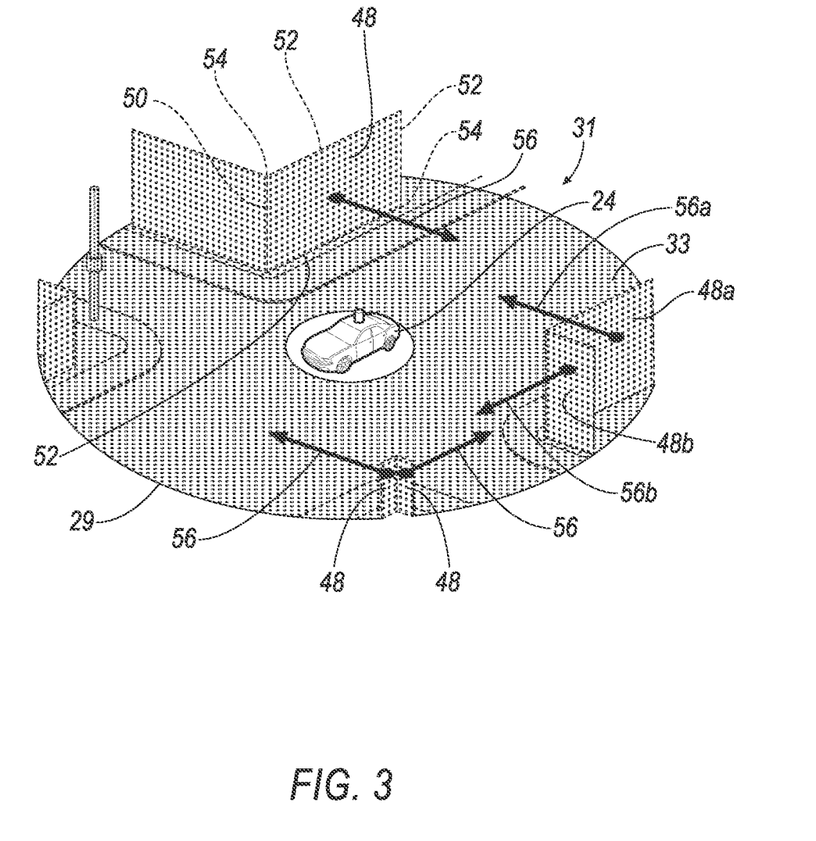
FIG. 3 is an illustration of data collected by a sensor of the vehicle and specifying a point cloud.

A sensor 28 defines a field of view 29 (illustrated in FIGS. 2 and 3). The field of view 29 of each sensor 28 is a volume relative to, and detectable, by such sensor 28. The volume may be defined by azimuth and altitude angle ranges, as well as by a depth, or detection distance.

The propulsion system 40 translates energy into motion of the vehicle 24, e.g., in response to an instruction from the computer 34 and/or in response to an operator input, such as to an accelerator pedal. For example, the propulsion system 40 may include a conventional powertrain having an internal-combustion engine coupled to a transmission that transfers rotational motion to wheels; an electric powertrain having batteries, an electric motor, and a transmission that transfers rotational motion to the wheels; a hybrid powertrain having elements of the conventional powertrain and the electric powertrain; or any other type of structure for providing motion to the vehicle 24. In the case of an aerial vehicle, the propulsion system 40 may include one or more motors operatively coupled to one or more propellers. The motors provide torque that rotates the propellers, e.g., to generate thrust and control a pitch, roll, and/or yaw of an aerial drone. The propulsion system 40 can be controlled by, and may report data via, an electronic control unit (ECU) or the like in communication with the computer 34.

The braking system 42 resists motion of the vehicle 24 to thereby slow and/or stop the vehicle 24, e.g., in response to an instruction from the vehicle computer 34 and/or in response to an operator input, such as to a brake pedal. The braking system 42 may include friction brakes such as disc brakes, drum brakes, band brakes, and so on; regenerative brakes; any other suitable type of brakes; or a combination. The braking system 42 may be controlled by, and may report data via, an electronic control unit (ECU) or the like in communication with the vehicle computer 34.

The steering system 44 and controls the turning of wheels of the vehicle 24. The steering system 44 is in communication with and receives input from a steering wheel and the vehicle computer 34. The steering system 44 may be a rack-and-pinion system with electric power-assisted steering, a steer-by-wire system, as are both known in the art, or any other suitable system.

The vehicle 24 may include the navigation system 32. The navigation system 32 is implemented via circuits, chips, or other electronic components that can determine a present location of the vehicle 24. The navigation system 32 may be implemented via satellite-based system such as the Global Positioning System (GPS). The navigation system 32 may triangulate the location of the vehicle 24 based on signals received from various satellites in the Earth's orbit. The navigation system 32 is programmed to output signals representing the present location of the vehicle 24. The navigation system 32 may use data from sensors 28 of the vehicle 24, e.g., wheel speed sensors and a magnetometer, to further determine the location of the vehicle 24. In some instances, the navigation system 32 is programmed to determine a route from the present location to a future location, including developing alternative routes, e.g., when a road is closed or congested. The navigation system 32 may access a map 26 stored in the memory of the vehicle computer 34 (discussed below) and develop the route according to the map 26.

The vehicle 24 may include a communication network 46 including hardware, such as a communication bus, for facilitating communication among components of the vehicle 24, such as the computer 34, the propulsion system 40, the braking system 42, the steering system 44, the sensors 28, and the navigation system 32. The communication network 46 may facilitate wired or wireless communication among the components in accordance with a number of communication protocols such as controller area network (CAN), Ethernet, WiFi, Local Interconnect Network (LIN), and/or other wired or wireless mechanisms.

The vehicle computer 34, implemented via circuits, chips, and/or other electronic components, is included in the system 20 for carrying out various operations, including as described herein. The vehicle computer 34 is a computing device that generally includes a processor and a memory, the memory including one or more forms of computer-readable media and storing instructions executable by the processor for performing various operations, including as disclosed herein. The memory of the vehicle computer 34 further generally stores remote data received via various communications mechanisms; e.g., the vehicle computer 34 is generally configured for communications on the communication network 46 or the like, and/or for using other wired or wireless protocols, e.g., Bluetooth, etc. The vehicle computer 34 may also have a connection to an onboard diagnostics connector (OBD-II). Via the communication network 46 and/or other wired or wireless mechanisms, the vehicle computer 34 may transmit and receive messages to and from various devices in the vehicle 24, e.g., steering system 44, the braking system 42, the propulsion system 40, the navigation system 32, the sensors 28, etc. Although one vehicle computer 34 is shown in FIG. 1 for ease of illustration, it is to be understood that the vehicle computer 34 could include, and various operations described herein could be carried out by, one or more computing devices.

The vehicle computer 34 is programmed to, i.e., the memory of the vehicle computer 34 stores instructions executable by the processor of the vehicle computer 34 to, identify a location and an orientation of the vehicle 24 on the map 26. The vehicle computer 34 may identify the location and orientation of the vehicle 24 based on data from the navigation system 32 and the sensors 28. The vehicle computer 34 may identify the location and the orientation of the vehicle 24 based on a location and orientation of an object 30, e.g., a building, traffic-signal, etc., on the map 26 and a location of the object 30 detected by the sensors 28 and relative to the vehicle 24. The vehicle computer 34 may identify the location and orientation of the vehicle 24 with other techniques, such as those using conventional geolocation (e.g., GPS), real-time kinematics (RTK), visual and/or LIDAR odometry, and inertial measurement unit (IMU) data.

For example, the vehicle computer 34 may identify an object 30 detected by the sensors 28 as being an object 30 on the map 26, e.g., specified by the map data. To identify the object 30, the vehicle computer 34 may compare one or more parameters, e.g., length, width, curvature, etc., specified by the data generated with a LIDAR sensor with one or more parameters specified by the data of the object 30 on the map 26. The vehicle computer 34 may identify object 30 in the data from the LIDAR sensor as the object 30 on the map 26 when the parameters specified in such data match, or are within a threshold amount of matching, e.g., 95%. Additionally or alternatively, the vehicle computer 34 may identify the object 30 based on image recognition analysis of data specifying one or more images captured by a camera. The objects 30 may be recognized in the image data using conventional techniques and methods, e.g., parameters of such objects 30 may be compared to the parameters specified by the data of the object 30 on the map 26.

The vehicle computer 34 may determine a location and orientation of the detected object 30 relative to the vehicle 24, e.g., a distance from the vehicle 24 to the object 30, and a direction of the object 30 from the vehicle 24 (such as angle to the right or left of vehicle forward). The location and orientation of the detected object 30 relative to the vehicle 24 may be determined based on data from sensors 28. For example, time of flight data from LIDAR sensor, stereo image analysis of images from a pair of cameras, or with other conventional techniques. The vehicle computer 34 may combine the identified location and orientation of the detected object 30 relative to the vehicle 24 with the location and orientation of the object 30 on the map 26 to identify a location and an orientation of the vehicle 24 on the map 26, e.g., using conventional techniques.

The vehicle computer 34 may be programmed to identify planes 48 in a point cloud 31 (illustrated in FIGS. 3 and 4) specified by data from a LIDAR sensor. The vehicle computer 34 may identify a plane 48 by selecting three points 33 of the point cloud 31 that are close together, typically points 33 where there are no other points 33 between any pair of selected points 33. The vehicle computer 34 may define the plane 48 based on the selected three points 33, i.e., such that all points 33 on the plane 48. The computer 34 may then identify additional points 33 of the point cloud 31 that are within a threshold distance e.g., 10 centimeters, of at least one selected point 33 and are within a threshold distance, e.g., 10 centimeters, of the plane 48 along an axis normal to the plane 48. Such identified additional points 33 may also be selected in addition to the previously selected three points 33.

Figure 4:
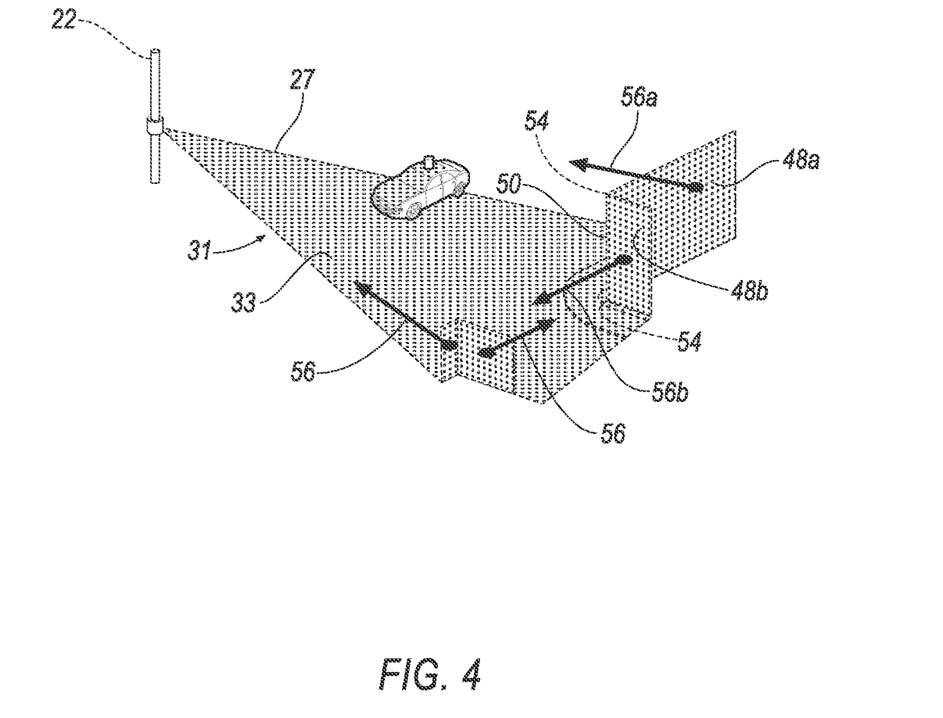
FIG. 4 is an illustration of data collected by the infrastructure sensor and specifying a point cloud.

The vehicle computer 34 may re-define the plane 48 based on all selected points 33, e.g., such that the plane 48 is best fit to the points 33. For example, the vehicle computer 34 may best fit the plane 48 using conventional techniques. The vehicle computer 34 may then identify additional points 33 of the point cloud 31 that are within the threshold distance of at least one selected point and are within the threshold distance of the plane 48. The vehicle computer 34 may select such points 33 and again redefine the plane 48, e.g., repeating iteratively until no more points 33 can be identified within the threshold distance of at least one selected point 33 and within the threshold distance of the plane 48. The vehicle computer 34 may identify the planes 48 with the distribution of points 33 in the point cloud 31 by identifying a subset of points 33 with the greatest number of points 33 that can be represented by one of the planes 48 with small error. The vehicle computer 34 estimates an equation specifying the plane 48 and removes points 33 from the point cloud 31 hierarchically. The equation specifying the plane 48 may be identified with the Eigen value/vector decomposition of the covariance matrix of the subset of points 33 from the point cloud 31. The computer 34 may identify the planes 48 with other techniques, such as those conventionally known.

The planes 48 may be bounded by one or more intersections 50 with one or more other planes 48 and/or at edges 52 defined by the selected points 33. The vehicle computer 34 may identify one or more corners 54 where the intersections 50 and/or edges 52 meet.

The vehicle computer 34 may identify the position of the plane 48, e.g., the position of one or more corners 54 of the plane 48, of a center of the plane 48, relative to the vehicle 24. For example, the vehicle computer 34 may identify that one of the corners 54 of the plane 48 is 20 meters from the vehicle 24, and at an azimuth angle of 20 degrees to the right of vehicle forward and an altitude angle of 5 degrees upward. The vehicle computer 34 may additionally determine the positions of the corners 54 relative to each other.

The vehicle computer 34 may identify an orientation of the plane 48, e.g., relative to a facing direction of the vehicle 24. For example, the vehicle computer 34 may identify the plane 48 is elongated and extending 20 degrees to the left and 0 degrees upward relative to a forward direction of the vehicle 24. The vehicle computer 34 may determine the elongation and extension of the plane 48 based on the selected points 33, e.g., along an edge 52 or intersection 50, along a longest line connecting adjacent corners 54 (e.g., adjacent corners 54 of the plane 48 that are spaced furthest from each other relative to spacing of other corners 54 from each other).

The vehicle computer 34 may be programmed to identify vectors 56 in the point cloud 31. The vehicle computer 34 may identify a vector 56 based on a plane 48. For example, a root, or starting location, of the vector 56 may be at a center of the plane 48. The center of the plane 48 may be a geometrically weighted center of the selected points of the point cloud data used to define the plane 48. The vector 56 may extend normally (perpendicularly) with respect to the plane 48. The vector 56 may have a length based on a size, e.g., in meters squared, of the plane 48. For example, the greater the size, the longer the vector 56. The length of the vector 56 may be linearly scaled to the size of the plane 48.

The vehicle computer 34 may identify the position of the vector 56, e.g., the position of the root of the vector 56, relative to the vehicle 24. For example, the computer may identify the root of the vector 56 is 15 meters from the vehicle 24, and at an azimuth angle of 50 degrees to the right of vehicle forward and an altitude angle of 15 degrees upward. The vehicle computer 34 may identify an orientation of the vector 56, e.g., relative to a facing direction (i.e., a forward direction along a longitudinal axis) of the vehicle 24. For example, the vehicle computer 34 may identify the vector 56 is extending 15 degrees to the left and 0 degrees upward relative to a forward direction of the vehicle 24.

The vehicle computer 34 may identify a location and orientation of object 30, the plane 48 and/or vector 56 on the map 26. For example, the vehicle computer 34 may use the position and orientation of the vehicle 24 on the map 26 as a starting datum and may determine the position and orientation of the object 30, the plane 48 and/or the vector 56 on the map 26 based on the position and orientation of the plane 48 and/or vector 56 relative to the vehicle 24. In other words, the relative position and orientation of the plane 48 and/or vector 56 relative to the vehicle 24 may be combined with the location and orientation of the vehicle 24 on the map 26.

The vehicle 24 may identify multiple locations and orientations of the object 30, the plane 48 and/or vector 56 on the map 26, e.g., while the vehicle 24 is at different locations on the map 26. The vehicle computer 34 may identify an average location and orientation of the multiple locations and orientations of the object 30, plane 48, and/or vector 56 as the location and the orientation of the object 30, plane 48 and/or the vector 56 on the map 26. The average location of the object 30, plane 48, and/or vector 56 is a location on the map that expresses the typical, e.g., mean, location of the multiple identified locations of the object 30, plane 48, and/or vector 56 on the map. The average orientation of the object 30, plane 48, and/or vector 56 on the map is an orientation that expresses the typical orientation of the multiple identified orientations of the object 30, plane 48, and/or vector 56 on the map. The average location may be standard vector averaging, while average for orientation may be an average in the Rimmenian manifold which only includes numbers in the space of possible orientations (e.g., −180 to 180 degrees or 0-360, alternatively). The vehicle computer 34 may identify the average location of the multiple locations by identifying averages of the individual conditionate locations, e.g., by summing all the x-coordinates of the multiple locations of the object 30 on the map and dividing by the number of the multiple locations, and so on for the y-coordinates and z-coordinates. The vehicle computer 34 may identify the average orientation of the multiple orientations by identifying the average facing direction of a common (or same) specified surface of the physical feature or object 30 on the map 26, e.g., by summing all the compass heading directions (or angle relative to the X,Y, and Z axes) of the multiple orientations on the map and dividing by the number of the multiple orientations. The vehicle computer 24 may use other conventional techniques to identify the average location and orientation of the multiple locations and orientations of the object 30, plane 48, and/or vector 56 on the map.

The vehicle computer 34 may be programmed to transmit data, e.g., to the server computer 36 and/or the infrastructure sensor 22, e.g., via the wide area network 38. The transmitted data may be from the sensors 28 and may specify the external world, e.g., image data from a camera, or point cloud data from a LIDAR sensor. The transmitted data may specify one or more objects 30, planes 48, and/or vectors 56 defined by the data. The transmitted data may specify locations and orientations of the objects 30, planes 48, and/or vectors 56. The locations and orientations of the objects 30, planes 48, and/or vectors 56 may be on the map 26 and/or relative to the vehicle 24. The transmitted data may specify the location and orientation of the vehicle 24 on the map 26. The vehicle computer 34 may transmit data in response to receiving a request for such data, e.g., from the server computer 36 and/or the infrastructure sensor 22.

The vehicle computer 34 may be programmed to navigate the vehicle 24. For example, the vehicle computer 34 may transmit commands to the steering system 44, the propulsion system 40, and/or the braking system 42. The commands may specifically actuation of the systems 40, 42, 44 to navigate the vehicle 24 along a route, i.e. a specified path from point A to point B, while avoiding obstacles. The vehicle computer 34 may determine the commands based on data from the navigation system 32 and the sensors 28, e.g., specifying a location of the vehicle 24, a heading of the vehicle 24, a route, one or more detected objects 30 (such as other vehicles, pedestrians, buildings, lane markers, etc.). The computer may navigate the vehicle 24 based on the data from the infrastructure sensor 22. For example, LIDAR or image data from the infrastructure sensor 22 may be fused with data from the sensors 28 of the vehicle 24. As another example, data from the infrastructure structure sensor may specify locations of detected objects 30, e.g., locations of other vehicles on the map 26. The vehicle computer 34 may navigate the vehicle 24 based on data from the sensors 28, the navigation system 32, and/or the infrastructure sensor 22 with conventional techniques.

The infrastructure sensor 22 is a sensor assembly in a fixed geographical location, e.g., fixed to a building, bridge, street post, etc. The infrastructure sensor 22 detects the external world, for example, the infrastructure sensor 22 may include radar sensors, scanning laser range finders, light detection and ranging (LIDAR) devices, and image processing sensors such as cameras. The infrastructure sensor 22 defines a field of view 27 (illustrated in FIGS. 2 and 4). The infrastructure sensor 22 may include communications devices, for example, configured to provide communication with the vehicle computer 34 and the server computer 36 via the wide area network 38. The infrastructure sensor 22 may include a computer, implemented via circuits, chips, and/or other electronic components. The computer is a computing device that generally includes a processor and a memory, the memory including one or more forms of computer-readable media and storing instructions executable by the processor for performing various operations, including as disclosed herein.

The infrastructure sensor 22 may be programmed to, i.e., the computer of the infrastructure sensor 22 may be programmed to, identify objects 30, planes 48, and/or vectors 56, including their respective locations and orientations relative to the infrastructure sensor 22, e.g., as described for the vehicle computer 34.

The infrastructure sensor 22 may be programmed to identify locations and orientations of objects 30, planes 48, and/or vectors 56 on the map, e.g., as described for the vehicle computer 34 and after the location and orientation of the infrastructure sensor 22 on the map is stored in memory of the infrastructure sensor 22.

The infrastructure sensor 22 may be programmed to transmit data, e.g., to the vehicle 24, the server computer 36, etc., via the wide area network 38. The data transmitted by the infrastructure sensor 22 may specify the external world detected by the sensor, e.g., image data from a camera, data specifying a point cloud 31 generated from a LIDAR sensor, etc. The transmitted data may specify one or more objects 30, planes 48, and/or vectors 56 defined by the data. The transmitted data may specify locations and orientations of the objects 30, planes 48, and/or vectors 56. The locations and orientations of the objects 30, planes 48, and/or vectors 56 may be relative to the infrastructure sensor 22. The locations and orientations of the objects 30, planes 48, and/or vectors 56 may be relative to a location and orientation of the infrastructure sensor 22 on the map 26.

The infrastructure sensor 22 may be programmed to may be programmed to navigate a second vehicle (not shown) based on the location and orientation of the infrastructure sensor 22 on the map 26. For example, the infrastructure sensor 22 may detect objects 30 (and identify their locations and orientations on the map 26), such as other vehicles, that are not detectable by sensors 28 of the second vehicle. The infrastructure sensor 22 may transmit data specifying the locations and orientations of detected objects 30 on the map 26 to the second vehicle, e.g., so the second vehicle may navigate to avoid impact with such objects 30. As another example, the infrastructure sensor 22 may transmit a command, e.g., instructing the second vehicle to stop at an intersection of roads on the map 26 when data collected by the infrastructure sensor 22 specifies cross traffic at the intersection.

The server computer 36 is remote from the vehicle 24 and the infrastructure sensor 22. The server computer 36 may be one or more computer servers, each including at least one processor and at least one memory, the memory storing instructions executable by the processor, including instructions for carrying out various steps and processes described herein. The server computer 36 may include or be communicatively coupled to a data store for storing collected data.

The server computer 36 may be programmed to identify a location and an orientation of the vehicle 24 on the map 26. The server computer 36 may identify the location and the orientation of the vehicle 24 by receiving data from the vehicle 24 specifying the location and the orientation of the vehicle 24 on the map 26. The server computer 36 may identify the location and the orientation of the vehicle 24 based on data received by the server computer 36 and generated by sensors 28 of the vehicle 24, data generated sensors 28 of a second vehicle and/or an infrastructure sensor 22 having an identified location on the map 26, etc., e.g., as described for the vehicle computer 34 and/or with conventional techniques.

The server computer 36 may be programmed to identify objects 30, planes 48 and vectors 56 based on data received from the vehicle 24 and/or infrastructure sensor 22, including respective locations and orientation relative to the vehicle 24 and/or the infrastructure sensor 22, e.g., as described for the vehicle computer 34.

The server computer 36 may identify a first plane 48 identified in a first point cloud 31 generated by the infrastructure sensor 22 and a second plane 48 identified in a second point cloud 31 generated by the sensor 28 of the vehicle 24 as being a same plane 48. In other words, in this context same planes 48 are planes 48 defined by different point clouds 31 that specify a common surface. For example, the points 33 of the respective point clouds 31 may specify a common wall or other object 30 surface detected by both the infrastructure sensor 22 and sensors 28 of the vehicle 24.

The server computer 36 may identify the planes 48 identified in the different point clouds 31 as being the same based on relative positions of corners 54, intersections, 50 and/or edges 52 of each plane 48 being substantially the same. The server computer 36 may identify the planes 48 identified in the point clouds 31 from the infrastructure sensor 22 and the sensor 28 of the vehicle 24 as being the same based on similar relationships between the planes 48 and other planes 48 identified in the respective point clouds 31. For example, the server computer 36 may identify an angle defined between a first plane 48 and a second plane 48 in the point cloud 31 generated by the infrastructure sensor 22. The server computer 36 may identify an angle defined between a first plane 48 and a second plane 48 in the point cloud 31 generated by the sensor 28 of the vehicle 24. The server computer 36 may identify the first planes 48 as being same planes 48 when the angles are substantially the same.

The server computer 36 may identify a vector 56 identified in a point cloud 31 generated by the infrastructure sensor 22 and a vector 56 identified in a point cloud 31 generated by the sensor 28 of the vehicle 24 as being same vectors 56. Same vectors 56 are vectors 56 defined by point clouds 31 that specify a common surface specified by the points 33 of the point clouds 31, e.g., a common wall detected by both the infrastructure sensor 22 and sensors 28 of the vehicle 24.

The server computer 36 may identify the vectors 56 identified in the different point clouds 31 as being the same based on a length of the vectors 56 being substantially the same and/or based on similar relationships between the vectors 56 and other vectors 56 identified in the respective point clouds 31. For example, the server computer 36 may identify a distance between, and a relative orientation of, a first vector 56 and a second vector 56 in the point cloud 31 generated by the infrastructure sensor 22. The server computer 36 may also identify a distance between, and a relative orientation of, a first vector 56 and a second vector 56 in the point cloud 31 generated by the sensor 28 of the vehicle 24. The server computer 36 may identify the first vectors 56 as being same vectors 56 when the distances and relative orientations are substantially the same.

The server computer 36 is programmed to determine a location and an orientation of the infrastructure sensor 22 on the map 26 based on the location and the orientation of the vehicle 24 on the map, the data from the sensor 28 of the vehicle 24, and the data from the infrastructure sensor 22. The data from the sensor 28 of the vehicle 24 may specify locations and orientations of objects 30, planes 48, and/or vectors 56 on the map 26 and/or relative to the vehicle 24. The data from the infrastructure sensor 22 may specify locations and orientations of objects 30, planes 48, and/or vectors 56 relative to the infrastructure sensor 22.

The server computer 36 may determine the location and the orientation of the infrastructure sensor 22 on the map 26 by combining the location and orientation of the vehicle 24 on the map 26 with the location and orientation of the object 30, the plane 48, and/or the vector 56 relative to the vehicle 24, and with the location and orientation of the object 30, the plane 48, and/or the vector 56 relative to the infrastructure sensor 22.

The server computer 36 may determine the location and the orientation of the infrastructure sensor 22 on the map 26 by first identifying the location and orientation the location of the object 30, the plane 48, and/or the vector 56 on the map 26 (or the average location and orientation as described above), and then determining the orientation of the infrastructure sensor 22 on the map 26 by combining the location and the orientation of the object 30, the plane 48, and/or the vector 56 on the map 26 with the position and orientation of the object 30, the plane 48, the and/or vector 56 relative to the infrastructure sensor 22. The server computer 36 may determine the location and orientation of the infrastructure sensor 22 on the map 26 using triangulation or other conventional techniques.

The server computer 36 may combine the location and the orientation of the object 30, the plane 48, and/or the vector 56 on the map 26 with the position and orientation of the object 30, the plane 48, the and/or vector 56 relative to the infrastructure sensor 22 by aligning the respective the objects 30, the planes 48, and/or the vectors 56 in the data from the sensor 28 of the vehicle 24 with the respective the objects 30, the planes 48, and/or the vectors 56 in the data from the infrastructure sensor 22. The server computer 36 aligns same objects 30, planes 48, and/or vectors 56 in the respective data such that the same objects 30, planes 48, and/or vectors 56 overlap, i.e., are on a same location and orientation on the map 26. For example, the first and second planes 48a, 48b of the data from the infrastructure sensor 22 may be aligned to overlap the first and second planes 48a, 48b of the data from the sensor 28 of the vehicle 24. As another example, the first and second vectors 56a, 56b of the data from the infrastructure sensor 22 may be aligned to overlap the first and second vectors 56a, 56b of the data from the sensor 28 of the vehicle 24. Aligning objects 30, the planes 48, and/or the vectors 56 is advantageously more efficient, i.e., uses less computing resources and/or time, than aligning point clouds 31. The respective the objects 30, the planes 48, and/or the vectors 56 in the data from the infrastructure sensor 22 may be aligned with the objects 30, the planes 48, and/or the vectors 56 in the data from the sensor 28 of the vehicle 24 by solving an optimization problem, such as an objective function Wahba's problem, the lazy projections GD algorithm, or other conventional technique.

The server computer 36 may identify additional locations and orientations of the vehicle 24 relative to the map 26 while the vehicle 24 is at different location and orientations. The server computer 36 may collect additional data from the vehicle sensor 28 while the vehicle 24 is at the additional locations and orientations. The server computer 36 may determine additional locations and orientations of the infrastructure sensor 22 on the map 26 based on the additional locations and orientations of the vehicle 24, the additional data from the vehicle sensor 28, and the data from the infrastructure sensor 22, e.g., as described above. The computer 36 may identify an average location and orientation of the multiple locations and orientations of the infrastructure sensor 22 on the map 26, e.g., providing increased accuracy to the determined location and orientation of the infrastructure sensor 22 on the map 26. The average location of the infrastructure sensor 22 is a location on the map that expresses the typical, e.g., mean, location of the multiple identified locations of the infrastructure sensor 22 on the map. The average orientation of the infrastructure sensor 22 on the map is an orientation that expresses the typical orientation of the multiple identified orientations of the infrastructure sensor 22 on the map. The computer 36 may identify the average location of the multiple locations of the infrastructure sensor 22 by identifying averages of the individual conditionate locations, e.g., by summing all the x-coordinates of the multiple locations on the map and dividing by the number of the multiple locations, and so on for the y-coordinates and z-coordinates. The computer 36 may identify the average orientation of the multiple orientations of the infrastructure sensor 22 by identifying the average facing direction of the infrastructure sensor 22, e.g., by summing all the compass heading directions (or angle relative to the X, Y, and Z axes) of the multiple orientations of the infrastructure sensor 22 on the map and dividing by the number of the multiple orientations. The computer 36 may use other conventional techniques to identify the average location and orientation of the infrastructure sensor 22 on the map.

The server computer 36 may store the location and orientation of the infrastructure sensor 22 on the map 26 in memory of the server computer 36. The server computer 36 may transmit the location and orientation of the infrastructure sensor 22 on the map 26 to the infrastructure sensor 22, e.g., to be stored in memory of the infrastructure sensor 22.

The server computer 36 may be programmed to transmit data specifying the location and orientation of the infrastructure sensor 22 on the map 26 to the vehicle 24 and/or a second vehicle for autonomous and/or semiautonomous navigation of the vehicle 24 and/or the second vehicle. For example, the server computer 36 may transmit data specifying the location and orientation of the infrastructure sensor 22 on the map 26 via the wide area network 38 to the vehicle 24 and/or the second vehicle, and the vehicle 24 and/or the second vehicle may fuse data from infrastructure sensor 22 with data from sensors 28 of the second vehicle using the location and orientation of the infrastructure sensor 22 on the map 26, e.g., using conventional techniques for fusing data from multiple sensors for autonomously or semi-autonomously operating a vehicle.

Figure 5:
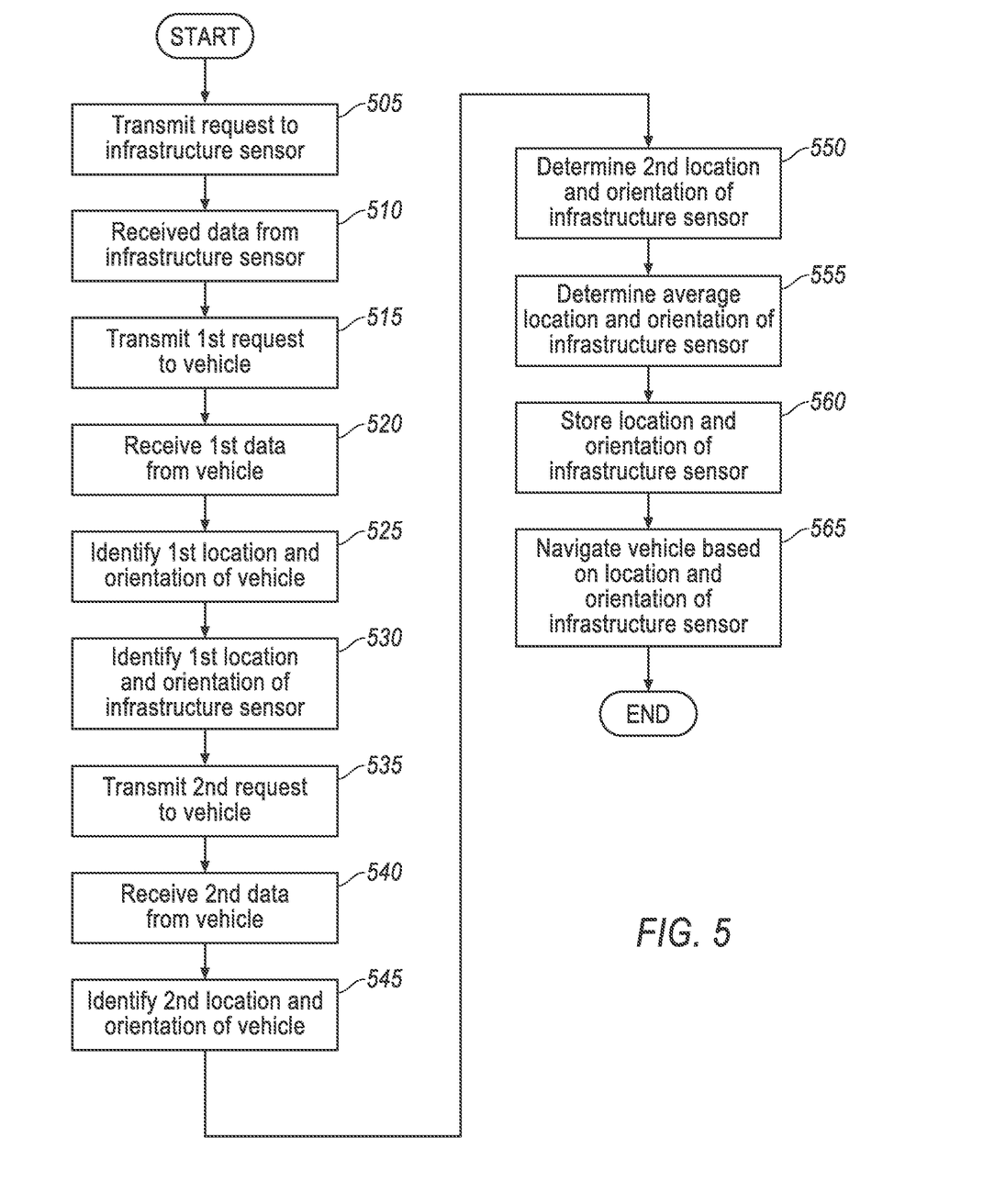
FIG. 5 is a flow chart illustrating a process for controlling the system.

FIG. 5 is a process flow diagram illustrating an exemplary process 500 for operating the system 20. The process 500 begins in a block 505 where the server computer 36 transmits a request to the infrastructure sensor 22. The request may specify the infrastructure sensor 22 provide raw data, e.g., image and/or point cloud data. The request may specify the infrastructure sensor 22 provide data specifying locations and orientations of objects 30, planes 48, and/or vectors 56 identified in data generated by the infrastructure sensor 22.

At a block 510 the server computer 36 receives the data requested at the block 505 from the infrastructure sensor 22.

At a block 515 the server computer 36 transmits a first request to the vehicle 24. The first request specifies the vehicle 24 provide first data generated by the sensors 28 of the vehicle 24 while the vehicle 24 is at a first location and orientation. The first request may specify data specifying locations and orientations of objects 30, planes 48, and/or vectors 56 identified in the first data by the vehicle computer 34.

At a block 520 the server computer 36 receives the first data requested at the block 515 from the vehicle 24.

At a block 525 the server computer 36 identities the first location and orientation of the vehicle 24 on a map 26. The server computer 36 may identify the first location and orientation based on data received from the vehicle 24 specifying the first location and orientation.

At a block 530 the server computer 36 determines a first location and orientation of the infrastructure sensor 22 on the map 26 based on the data from the infrastructure sensor 22 received at the block 510, the first data from the vehicle 24 at the block 520, and the first location and orientation of the vehicle 24 identified at the block 525, e.g., as described herein.

At a block 535 the server computer 36 transmits a second request to the vehicle 24. The second request specifies the vehicle 24 provide second data generated by the sensors 28 of the vehicle 24 while the vehicle 24 is at a second location and orientation that is different than the first location and orientation. The second request may specify data specifying locations and orientations of objects 30, planes 48, and/or vectors 56 identified in the second data.

At a block 540 the server computer 36 receives the second data requested at the block 535 from the vehicle 24.

At a block 545 the server computer 36 identities the second location and orientation of the vehicle 24 on the map 26. The server computer 36 may identify the second location and orientation based on data received from the vehicle 24 specifying the second location and orientation.

At a block 550 the server computer 36 determines a second location and orientation of the infrastructure sensor 22 on the map 26 based on the data from the infrastructure sensor 22 received at the block 510, the second data from the vehicle 24 at the block 540, and the second location and orientation of the vehicle 24 identified at the block 545, e.g., as described herein.

At a block 555 the server computer 36 determines an average location and orientation of the infrastructure sensor 22 on the map 26 based on the first location and orientation of the infrastructure sensor 22 on the map 26 determined at the block 530 and the second location and orientation of the infrastructure sensor 22 on the map 26 determined at the block 550.

At a block 560 the server computer 36 stores data specifying the average location and orientation of the infrastructure sensor 22 on the map 26 determined at the block 555. Additionally or alternatively, the server computer 36 may transit data specifying the average location and orientation of the infrastructure sensor 22 on the map 26 to the infrastructure sensor 22, and the infrastructure sensor 22 may store such data.

At a block 565 the server computer 36 transmits data specifying the location and orientation of the infrastructure sensor 22 on the map 26 determined at the block 555 to the vehicle 24 or a second vehicle. The vehicle computer 34 or a computer of the second vehicle operates the respective vehicle 23 or second vehicle in the autonomous and/or semiautonomous mode based on the location and orientation of the infrastructure sensor 22 on the map 26.

With regard to the process 500 described herein, it should be understood that, although the steps of such process 500 have been described as occurring according to a certain ordered sequence, such process 500 could be practiced with the described steps performed in an order other than the order described herein. It further should be understood that certain steps could be performed simultaneously, that other steps could be added, or that certain steps described herein could be omitted. It should be additionally understood that that other computers may perform the process 500. For example, the vehicle computer 34 may perform the process 500 as described for the server computer 36. In other words, the description of the process 500 herein is provided for the purpose of illustrating certain embodiments and should in no way be construed so as to limit the disclosed subject matter.

Computing devices, such as the computer 34, 36, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The terms "in response to" and "upon" herein specify a causal relationship in addition to a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising a computer including a processor and a memory storing instructions executable by the processor to:
    identify a location and an orientation of a vehicle on a map; and
    after identifying the location and the orientation of the vehicle on the map, determine a location of an infrastructure sensor on the map based on the location and the orientation of the vehicle, data from a vehicle sensor, and data from the infrastructure sensor including data from at least one of a radar sensor, a scanning laser range finder, a light detection and ranging device (LIDAR), an imaging device, or a camera of the infrastructure sensor.

2. The system of claim 1, wherein the instructions further include instructions to identify the location and the orientation of the vehicle based on a location of an object on the map and a location of the object relative to the vehicle.

3. The system of claim 1, wherein the instructions further include instructions to identify a first location of an object on the map and based on the data from the vehicle sensor, to identify a second location of the object relative to the infrastructure sensor and based on the data from the infrastructure sensor, and to determine the location of the infrastructure sensor based on the first and second locations of the object.

4. The system of claim 1, wherein the instructions further include instructions to identify a first plane based on the data from the vehicle sensor, to identify a second plane based on the data from the infrastructure sensor, and to determine the location of the infrastructure sensor based on the first plane and the second plane.

5. The system of claim 1, wherein the instructions further include instructions to identify a first vector based on the data from the vehicle sensor, to identify a second vector based on the infrastructure sensor, and to determine the location of the infrastructure sensor based on the first vector and the second vector.

6. The system of claim 1, wherein the data from the vehicle sensor and the data from the infrastructure sensor includes point-cloud data, and the point cloud data from the infrastructure sensor data is used to determine the location of the infrastructure sensor.

7. The system of claim 1, wherein the instructions further include instructions to identify a second location and a second orientation of the vehicle relative to the map, collect second data from the vehicle sensor while the vehicle is at the second location and in the second orientation, and to determine the location of the infrastructure sensor on the map based on the location and the orientation of the vehicle, the data from the vehicle sensor, the second location and the second orientation of the vehicle, the second data from the vehicle sensor, and the data from the infrastructure sensor.

8. The system of claim 1, wherein the instructions further include instructions to determine an orientation of the infrastructure sensor on the map based on the location and the orientation of the vehicle, the data from the vehicle sensor, and the data from the infrastructure sensor.

9. The system of claim 1, wherein the computer is remote from the vehicle and the infrastructure sensor, and wherein the instructions further include instructions to store the location of the infrastructure sensor on the map in the memory of the computer.

10. The system of claim 1, wherein the instructions further include instructions to store the location of the infrastructure sensor on the map in a memory of the infrastructure sensor.

11. The system of claim 1, wherein the instructions further include instructions to navigate a second vehicle based on the location of the infrastructure sensor.

12. A method, comprising:
- identifying a location and an orientation of a vehicle on a map; and
- after identifying the location and the orientation of the vehicle on the map, determining a location of an infrastructure sensor on the map based on the location and the orientation of the vehicle, data from a vehicle sensor, and data from the infrastructure sensor including data from at least one of a radar sensor, a scanning laser range finder, a light detection and ranging device (LIDAR), an imaging device, or a camera of the infrastructure sensor.

13. The method of claim 12, further comprising identifying the location and the orientation of the vehicle based on a location of an object on the map and a location of the object relative to the vehicle.

14. The method of claim 12, further comprising identifying a first location of an object on the map and based on the data from the vehicle sensor, identifying a second location of the object relative to the infrastructure sensor and based on the data from the infrastructure sensor, and determining the location of the infrastructure sensor based on the first and second locations of the object.

15. The method of claim 12, further comprising identifying a first plane based on the data from the vehicle sensor, identifying a second plane based on the data from the infrastructure sensor, and determining the location of the infrastructure sensor based on the first plane and the second plane.

16. The method of claim 12, further comprising identifying a first vector based on the data from the vehicle sensor, identifying a second vector based on the data from the infrastructure sensor, and determining the location of the infrastructure sensor based on the first vector and the second vector.

17. The method of claim 12, wherein the data from the vehicle sensor and the data from the infrastructure sensor includes point-cloud data, and the point cloud data from the infrastructure sensor is used to determine the location of the infrastructure sensor.

18. The method of claim 12, further comprising identifying a second location and a second orientation of the vehicle on the map, collecting second data from the vehicle sensor while the vehicle is at the second location and in the second orientation, and determining the location of the infrastructure sensor on the map based on the location and the orientation of the vehicle, the data from the vehicle sensor, the second location and the second orientation of the vehicle, the second data from the vehicle sensor, and the data from the infrastructure sensor.

19. The method of claim 12, further comprising determining an orientation of the infrastructure sensor relative to the map based on the location and the orientation of the vehicle, the data from the vehicle sensor, and the data from the infrastructure sensor.

20. The method of claim 12, further comprising storing the location of the infrastructure sensor on the map in a memory of the infrastructure sensor.

* * * * *